F. P. WHITE.
RADIUS ROD FOR AUTOMOBILES.
APPLICATION FILED FEB. 21, 1918.
1,274,482.
Patented Aug. 6, 1918.
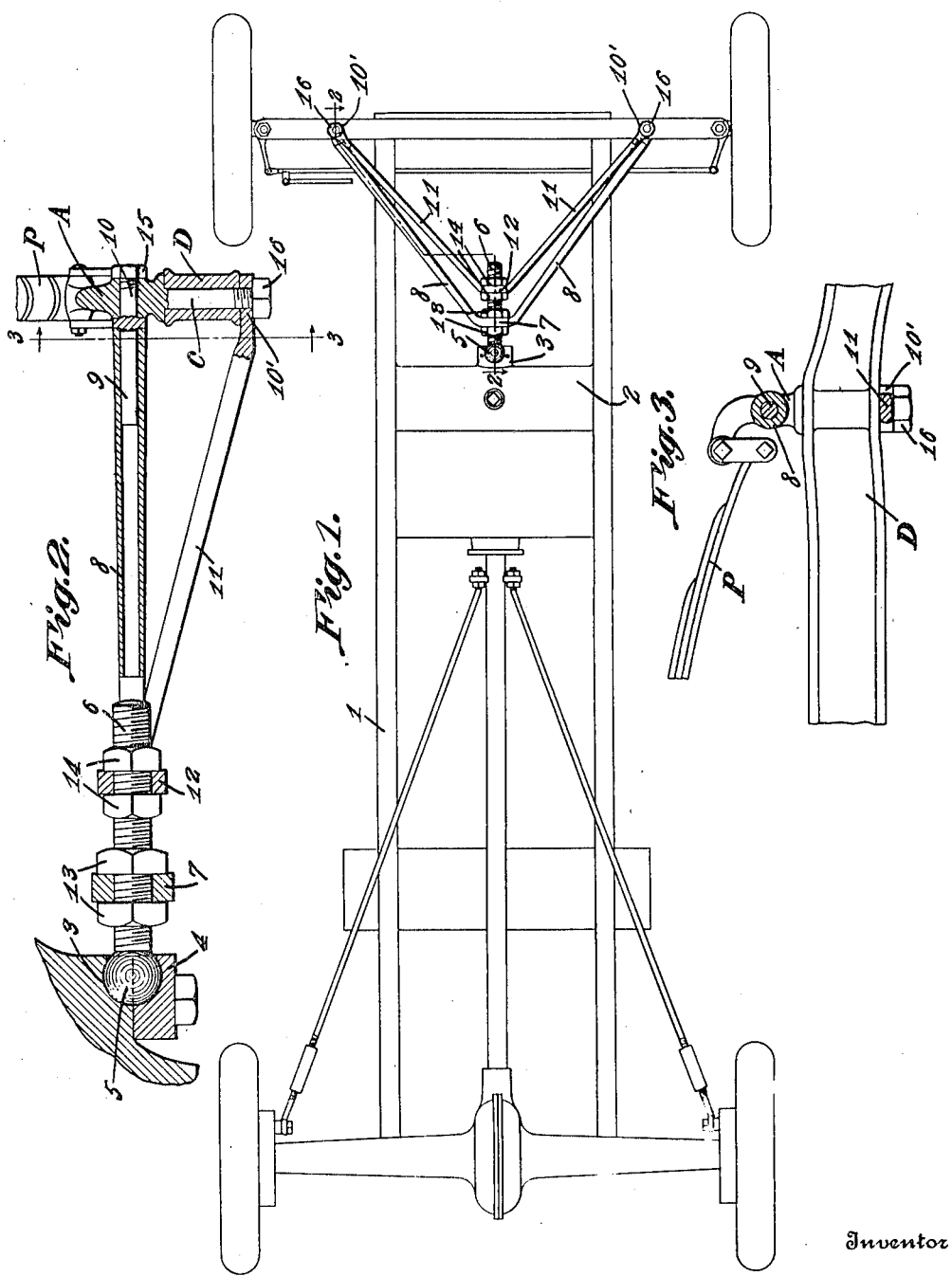
Witness
Inventor
F. P. White,
By C. A. Snow & Co.
Attorneys

UNITED STATES PATENT OFFICE.

FRANKLIN P. WHITE, OF SHALLOTTE, NORTH CAROLINA.

RADIUS-ROD FOR AUTOMOBILES.

1,274,482.   Specification of Letters Patent.   Patented Aug. 6, 1918.

Application filed February 21, 1918. Serial No. 218,506.

*To all whom it may concern:*

Be it known that I, FRANKLIN P. WHITE, a citizen of the United States, residing at Shallotte, in the county of Brunswick and State of North Carolina, have invented a new and useful Radius-Rod for Automobiles, of which the following is a specification.

This invention relates to radius rods for automobiles, one of its objects being to provide a radius rod which is cheap to manufacture, can be collapsed readily so as to be shipped by parcel post, and which, when set up for use, constitutes an efficient attachment for a motor vehicle.

A further object is to provide a device of this character which can be made readily and which will not easily get out of order, it being possible to adjust it accurately to the machine to which it is applied.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a bottom plan view of the chassis and running gear of a motor vehicle and showing the present improvements combined therewith, the retaining cap of the ball receiving socket being removed.

Fig. 2 is an enlarged section on line 2—2 of Fig. 1.

Fig. 3 is a section on line 3—3 of of Fig. 1.

Referring to the figures by characters of reference 1 designates the chassis of an automobile and extending from the engine base 2 is a socket member 3 provided with a removable retaining plate or cap 4. This socket member is designed to receive a ball 5 formed at one end of a rod or threaded stem 6. This stem projects through an eye 7 from which diverge tubular rods 8 the front end of each of which has a pin 9 seated therein and provided with a stem 10. The stems 10 projecting from the two pins 9 project through .openings in the posts A to which the ends of the cross spring P of the vehicle are connected. These posts have stems C extending downwardly through the axle D and the lower ends of said stems are secured in eyes 10 provided at the forward ends of brace rods 11. These rods converge to an eye 12 mounted on the threaded stem or rod 6. Nuts 13 are arranged in pairs on the rod or stem 6 for the purpose of holding the eye 7 adjustably on said stem and another pair of nuts 14 are arranged on the stem for holding the eye 12 adjustably thereon. As shown the stems 10 and C are held in place by nuts or the like. These have been indicated at 15 and 16 respectively.

When the device is not in use it can be arranged in a compact packet, and thus be readily shipped.

What is claimed is:—

1. An attachment for motor vehicles including a threaded rod or stem having a ball at one end for engagement with a socket member on a motor vehicle, an eye adjustably mounted on the rod and having diverging rods for attachment to the front axle of a motor vehicle, and forwardly diverging braces adjustably connected to said threaded rod for attachment to said axle.

2. An attachment for motor vehicles including a threaded rod or stem having a ball at one end for engagement with a socket member on a motor vehicle, a member adjustably mounted on said rod and having diverging members for attachment to the upper portion of the front axle of a motor vehicle, and braces in front of and adjustably connected to said threaded rod, said braces diverging forwardly and adapted to be attached to the bottom of said front axle.

3. An attachment for motor vehicles including a threaded rod or stem having a ball at one end for engagement with a socket member on a motor vehicle, an eye adjustably mounted on said rod, a forwardly diverging tubular member extending from the eye, pins seated in the forward ends of said members, stems projecting therefrom for engagement with the spring supporting posts on the front axle of a motor vehicle, another eye mounted on the threaded rod, forwardly extending brace rods projecting therefrom for engagement with the stems of the spring supporting posts on the front axle.

4. The combination with a motor vehicle having an engine base provided with a socket, of a threaded rod having a ball at one end detachably seated in the socket, spring supporting posts mounted on the front axle of a motor vehicle, and having stems projecting downwardly through said axle, there being a transverse opening in each of the posts, an eye adjustably mounted on the threaded rod and having tubular members diverging forwardly therefrom, pins seated in said members and having stems projecting through the openings in the posts and secured therein, another eye adjustably mounted on the threaded rod, and forwardly diverging braces extending therefrom and engaging the lower end portions of the stems of the posts.

In testimony that I claim the foregoing as my own, I have hereto affixed my signature in the presence of two witnesses.

FRANKLIN P. WHITE.

Witnesses:
S. C. TRIPP,
R. B. TRIPP.